Patented Nov. 14, 1933

1,934,778

UNITED STATES PATENT OFFICE 1,934,778

TITANIUM SULPHURIC ACID COMPOUNDS

Ludwig Teichmann, Leverkusen-on-the-Rhine, and Franz Specht, Cologne-on-the-Rhine, Germany, assignors to I. G. Farbenindustrie Aktiengesellschaft, Frankfort-on-the-Main, Germany No Drawing. Application January 6, 1931, Serial No. 507,040, and in Germany January 15, 1930

2 Claims. (Cl. 23—117)

The present invention relates to a process of preparing compounds consisting of titanium dioxide and sulphuric acid in such proportions that 1 mol of titanium dioxide is bound to 0.5–0.9 mol of sulphuric acid.

The new products are obtainable by treating a solution of titanium dioxide in sulphuric acid with a compound precipitating the sulphuric acid as a difficultly soluble sulphate. Such compounds are, for example, earth alkali metal-salts, -oxides and -hydroxides, lead salts and also organic compounds as, for instance, benzidine.

For preparing the products in question we start with a decomposition of a titanium ore (ilmenite) with sulphuric acid. This solution contains for about 1 mol of titanium dioxide 1 mol of sulphuric acid. Into this solution a sulphuric acid binding agent, such as for instance calicum carbonate, is introduced in such a proportion as is equivalent to a part of the sulphuric acid, for instance, 0.5 to 0.1 mol. Calcium sulphate precipitates, and the resulting solution is concentrated in vacuo until a sirup is obtained, which can be diluted with water for tanning or weighting purposes in the known manner. Also dry products can be obtained by evaporating the solution in vacuo or by drying the solution on a drum dryer. The dry products thus obtained are white crystalline masses which are easily pulverable and which dissolve in water without splitting off titanium dioxide.

It is obviously also possible to combine the process as described in the examples of application Serial No. 417,000, filed December 27, 1929, with the present process, for example, by carrying out the neutralization to a desired degree by means of calcium carbonate, and then finally adjusting the desired basicity by means of sodium hydroxide or carbonate, or by effecting the desired result in the reverse order.

The solution thus obtained contains sodium sulphate which, as stated in application Serial No. 417,000, favorably influences the pH concentration of the solution and the stability of the solution against hydrolysis.

In contradistinction to the invention described in application Serial No. 417,000, the present invention has the advantage that products are obtainable which only consist of titanium dioxide and sulphuric acid and which have no superfluous constituents, as for instance, sodium sulphate which always is contained in the products described in application Serial No. 417,000. These solutions have the disadvantage over concentrated titanium dioxide-sulphuric acid solutions (containing besides sodium sulphate) that sodium sulphate crystallizes out slowly and that the content of titanium dioxide in this tanning solution is thereby altered; when solid substances are produced tanning salts rich in sodium sulphate are obtained.

The invention is illustrated by the following examples without being restricted thereto:—

Example 1

Into a solution containing per liter 127 grams of $TiO_2$ and 450 grams of sulphuric acid (free and combined with titanium), are stirred 315 grams of calcium carbonate per liter of solution. The solution, after being separated from the precipitate, still contains 128 grams of $TiO_2$ and 149 grams of $H_2SO_4$=5% basicity, ($1TiOSO_4:1H_2SO_4$ being designated as 0% basic and $1TiO_2:OH_2SO_4$ as 100% basic). The precipitate is covered with a 10% sulphuric acid, this is drawn off and added to a fresh solution. In this way practically no $TiO_2$ is lost.

Example 2

Into a solution containing per liter 127.5 grams of $TiO_2$ and 187.8 grams of sulphuric acid (free and combined with titanium) are stirred 70 grams of calcium carbonate in the form of a paste per liter of solution. In the filtrate from the precipitate formed there are 101.3 grams of $TiO_2$ per liter and 98.0 grams of $H_2SO_4$ per liter=0.79 molecule $H_2SO_4:1TiO_2$ (calculated from the quantity of $CaCO_3$ added, 0.77 molecule $H_2SO_4$).

Example 3

In the same manner as in Example 2, by stirring strontium carbonate into a solution of 176.2 grams of $TiO_2$ per liter and 269.5 grams of $H_2SO_4$ per liter a solution of 163.2 grams of $TiO_2$ per liter and 150.3 grams of $H_2SO_4$ per liter is produced= approximately 0.75 of a molecule $H_2SO_4:1TiO_2$. This solution is evaporated at 60° C. and under a pressure of 12 mms. mercury.

A solid, dry product, soluble in water without residue and consisting of 41.8% of $TiO_2$ and 39.0% of $H_2SO_4$, is thus obtained.

Example 4

The solution obtained according to Example 2 containing 0.79 molecules of $H_2SO_4:1TiO_2$ is made up to a cencentration of 68 grams of $H_2SO_4$ per liter by the addition of 27.8 grams $Na_2CO_3$ per liter. This solution is evaporated in vacuo at 50° C. and 60 mms. Hg. whereby a solid salt is obtained containing 39.5% of $TiO_2$, 26.8% of $H_2SO_4$ (bound to titanium and free acid), total 45.9% of $H_2SO_4$, 8.9% of Na, the remainder being water of crystallization.

We claim:—

1. In a process of preparing tanning and weighting agents from aqueous solutions of titanium sulphuric acid compounds the steps which comprise adding to an aqueous sulphuric acid solution of titanium dioxide, containing for about one mol of titanium dioxide one mol of sulphuric acid, such a quantity of a basic agent forming a water-insoluble compound with sulphuric acid, that the remaining solution contains 0.5–0.9 mol of sulphuric acid upon one mol of titanium dioxide.

2. In a process of preparing tanning and weighting agents from aqueous solutions of titanium sulphuric acid compounds the steps which comprise adding to an aqueous sulphuric acid solution of titanium dioxide, containing for about one mol of titanium dioxide one mol of sulphuric acid, such a quantity of calcium carbonate that the remaining solution contains 0.5–0.9 mol of sulphuric acid upon one mol of titanium dioxide.

LUDWIG TEICHMANN.
FRANZ SPECHT.